(12) United States Patent
Jung

(10) Patent No.: US 12,270,696 B2
(45) Date of Patent: Apr. 8, 2025

(54) WATER-LEVEL MEASURING DEVICE USING GEAR RATIO

(71) Applicant: KEPCO ENGINEERING & CONSTRUCTION COMPANY, INC., Gyeongsangbuk-do (KR)

(72) Inventor: Seung Ha Jung, Gimcheon-si (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 0 days.

(21) Appl. No.: 18/218,382

(22) Filed: Jul. 5, 2023

(65) Prior Publication Data

US 2023/0341253 A1   Oct. 26, 2023

Related U.S. Application Data

(63) Continuation of application No. 17/572,026, filed on Jan. 10, 2022, now abandoned.

(30) Foreign Application Priority Data

Jan. 14, 2021   (KR) .......................... 10-2021-0005396

(51) Int. Cl.
*G01F 23/42* (2006.01)
*G01F 23/44* (2006.01)

(52) U.S. Cl.
CPC ............ *G01F 23/42* (2013.01); *G01F 23/443* (2013.01)

(58) Field of Classification Search
CPC ......... G01F 23/30; G01F 23/42; G01F 23/443
USPC .......................................... 73/318, 321, 451
See application file for complete search history.

(56) References Cited

U.S. PATENT DOCUMENTS

| 75,235 A | 3/1868 | Akers |
| 495,523 A | 4/1893 | Seinecke |
| 578,725 A | 3/1897 | Cooley et al. |
| 633,564 A | 9/1899 | Brantley |
| 675,307 A | 5/1901 | Voltzow et al. |
| 735,330 A | 8/1903 | Wright |
| 1,171,632 A | 2/1916 | Nuesell |

(Continued)

FOREIGN PATENT DOCUMENTS

| KR | 10-1114526 | 3/2012 |
| KR | 10-1668477 | 10/2016 |

(Continued)

OTHER PUBLICATIONS

Korean Office Action for App. No. 10-2021-0005396, mailed Mar. 7, 2022 (4 pages).

*Primary Examiner* — John Fitzgerald
(74) *Attorney, Agent, or Firm* — NIXON PEABODY LLP; Jeffrey L. Costellia

(57) ABSTRACT

A water-level measuring device using a gear ratio includes: a water tank filled with water; a float receiving buoyancy by being floated over a water surface of the water filled in the water tank; a cable connected to the float and extending to the outside of the water tank; a first gear connected with the cable; a second gear connected with the first gear; a weight pendulum connected with the second gear and moving in up and down directions, wherein when a water level of the water tank descends, the weight pendulum ascends due to a weight of the float, and when the water level of the water tank ascends, the weight pendulum descends due to the buoyancy of the float.

2 Claims, 6 Drawing Sheets

(56) References Cited

U.S. PATENT DOCUMENTS

| | | | |
|---|---|---|---|
| 1,402,086 A | 1/1922 | Neale | |
| 1,456,701 A | 5/1923 | Lundquist | |
| 1,517,905 A | 12/1924 | Hough | |
| 1,656,705 A | 1/1928 | Gould | |
| 1,801,212 A * | 4/1931 | Star | G01F 23/42 73/321 |
| 1,819,373 A | 8/1931 | Lundquist | |
| 1,854,266 A | 4/1932 | Lundquist | |
| 1,866,902 A | 7/1932 | Overmire | |
| 2,112,371 A | 3/1938 | Korvec | |
| 2,160,685 A | 5/1939 | Spaeth | |
| 2,193,423 A | 3/1940 | Jett | |
| 2,216,035 A | 9/1940 | Lang | |
| 2,522,988 A | 9/1950 | Caddell | |
| 2,600,341 A | 6/1952 | Thompson | |
| 2,681,570 A | 6/1954 | Galan et al. | |
| 2,700,222 A | 1/1955 | Swenson | |
| 2,713,794 A | 7/1955 | Burns | |
| 2,722,835 A | 11/1955 | Douglas | |
| 2,724,404 A | 11/1955 | Kass | |
| 2,811,039 A | 10/1957 | Hein | |
| 2,852,938 A | 9/1958 | Steil | |
| 2,874,574 A * | 2/1959 | Patureau | G01F 23/263 73/321 |
| 2,902,859 A | 9/1959 | Quist | |
| 2,949,777 A | 8/1960 | Ferron | |
| 2,957,347 A | 10/1960 | Bergstrom | |
| 3,088,318 A | 5/1963 | Steil | |
| 3,140,610 A | 7/1964 | Lanham | |
| 3,148,542 A | 9/1964 | Clift, Jr. | |
| 3,217,541 A | 11/1965 | Williamson | |
| 3,555,905 A * | 1/1971 | George | G01F 23/66 73/321 |
| 3,834,576 A * | 9/1974 | Heisterberg | F17B 1/00 220/220 |
| 4,061,901 A | 12/1977 | Saunders et al. | |
| 4,192,187 A | 3/1980 | Kennedy et al. | |
| 4,422,328 A | 12/1983 | Luchessa et al. | |
| 4,709,653 A | 12/1987 | Salomon | |
| 4,942,351 A * | 7/1990 | Kronau | G01F 23/0023 318/482 |
| 5,655,403 A | 8/1997 | Toliff | |
| 2010/0122988 A1 * | 5/2010 | Clanton | G01F 23/42 73/321 |
| 2011/0197994 A1 | 8/2011 | Home | |

FOREIGN PATENT DOCUMENTS

| | | | |
|---|---|---|---|
| KR | 101709622 B1 * | 2/2017 | |
| KR | 10-1949325 | 2/2019 | |

* cited by examiner

WATER-LEVEL MEASURING DEVICE USING GEAR RATIO

CROSS-REFERENCE TO RELATED APPLICATION

This application is continuation of application Ser. No. 17/572,026, filed Jan. 10, 2022 which claims priority under 35 U.S.C. § 119 to Korean Patent Application No. 102021-0005396, filed on Jan. 14, 2021, in the Korean Intellectual Property Office, the disclosure of which is incorporated by reference herein in its entirety.

BACKGROUND

1. Field

One or more embodiments relate to a water-level measuring device using a gear ratio, and more particularly, to a water-level measuring device using a gear ratio, the water-level measuring device measuring a water level by using a weight balance between a float and a weight pendulum and measuring a water level of a water tank in a non-power mechanical fashion through a gear ratio between a first gear connected to the float and a cable and a second gear connected to the weight pendulum.

2. Description of the Related Art

In general industrial sites, a water gauge for measuring a water surface of various tanks and heaters is used. The water gauge used in the industrial sites may include a reflex-type water gauge, a plain glass-water gauge, etc.

However, these water gauges are problematic as below. The reflex-type water gauge, the plain glass-water gauge, etc. check a water surface from the outside by observing the water surface through transparent glass, and due to contamination of a glass portion for identifying a water surface or interference with a steam portion, it may be difficult to identify the water surface.

In the case of one or more water tanks used in the industrial sites, it may be difficult to apply the water gauge, and thus, the water level is measured by using a measuring device, such as ultrasonic waves, a radar, a laser, etc. The measuring of the water level by using the measuring device, such as the ultrasonic waves, the radar, the laser, etc., uses waves reflected by the ultrasonic waves, the radar, the laser, etc.

However, the previous water gauge used in the industrial sites has the following problems. When the water level is measured by using the waves reflected by the ultrasonic waves, the radar, the laser, etc., an error may occur in the measurement of the water level due to diffused reflection generated on a water surface.

Also, vapors or bubbles are generated in a high-temperature environment, and in an environment in which the vapors or bubbles are generated, it may be difficult to use an ultrasonic measuring device.

In addition, in the case of a previous water-surface gauge and a previous water-level gauge, a measuring device is arranged in a vertically upper area of a region for which a water surface and a water level are to be measured. However, in the case of a region exposed to a hazardous environmental condition, due to for example radioactivity, corrosiveness, and acidity, it may be difficult to manage and maintain the measuring device.

Also, the previous water-level gauge uses electricity and electronic equipment, and thus, may have to be mounted in a location appropriate for the mounting of the electricity and the electronic equipment. However, in the case of the region exposed to the hazardous environmental condition, due to for example radioactivity, corrosiveness, and acidity, it may be difficult to mount the water-level gauge.

SUMMARY

One or more embodiments relate to a water-level measuring device using a gear ratio, and more particularly, to a water-level measuring device using a gear ratio, the water-level measuring device measuring a water level by using a weight balance between a float and a weight pendulum and measuring a water level of a water tank in a non-power mechanical fashion through a gear ratio between a first gear connected to the float and a cable and a second gear connected to the weight pendulum.

Additional aspects will be set forth in part in the description which follows and, in part, will be apparent from the description, or may be learned by practice of the presented embodiments of the disclosure.

According to one or more embodiments, a water-level measuring device measuring a water level by using a gear ratio includes: a water tank filled with a liquid including water, a float receiving buoyancy by being floated over a water surface of the water filled in the water tank; a cable connected to the float and extending to the outside of the water tank; a first gear connected with the cable; a second gear connected with the first gear; a weight pendulum connected with the second gear and moving in up and down directions, wherein when the water level of the water tank descends, the weight pendulum ascends due to a weight of the float, and when the water level of the water tank ascends, the weight pendulum descends due to the buoyancy of the float.

The water-level measuring device may further include a water-level indicator connected with the first gear and configured to indicate the water-level of the water tank to the outside via rotation of the first gear.

The weight of the float may be greater than a weight of the weight pendulum, and the weight of the weight pendulum may be greater than a weight of the cable.

The weight of the float may be greater than a sum of the weight of the weight pendulum and the weight of the cable.

The water tank may include a support wall which vertically extends and into which the float is inserted.

The water-level measuring device may further include a connector connected with the weight pendulum and configured to slidingly move in up and down directions and a bracket which vertically extends and into which the connector is inserted.

The water-level measuring device may further include a water-surface indicator connected with the weight pendulum and arranged outside the water tank, the water-surface indicator being configured to indicate a level of the water surface of the water tank.

The water-level measuring device may further include a water-level transmitter including a space into which the weight pendulum is inserted and in which the weight pendulum is configured to move, wherein the weight-level transmitter may be configured to transmit a signal to the outside according to a movement of the weight pendulum.

The water-level transmitter may include: a housing including a space into which the weight pendulum is inserted and in which the weight pendulum is configured to move; an input terminal connected with the housing and configured to supply a voltage; and an output terminal connected with the housing and configured to generate a voltage according to the movement of the weight pendulum.

The input terminal may include a battery.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
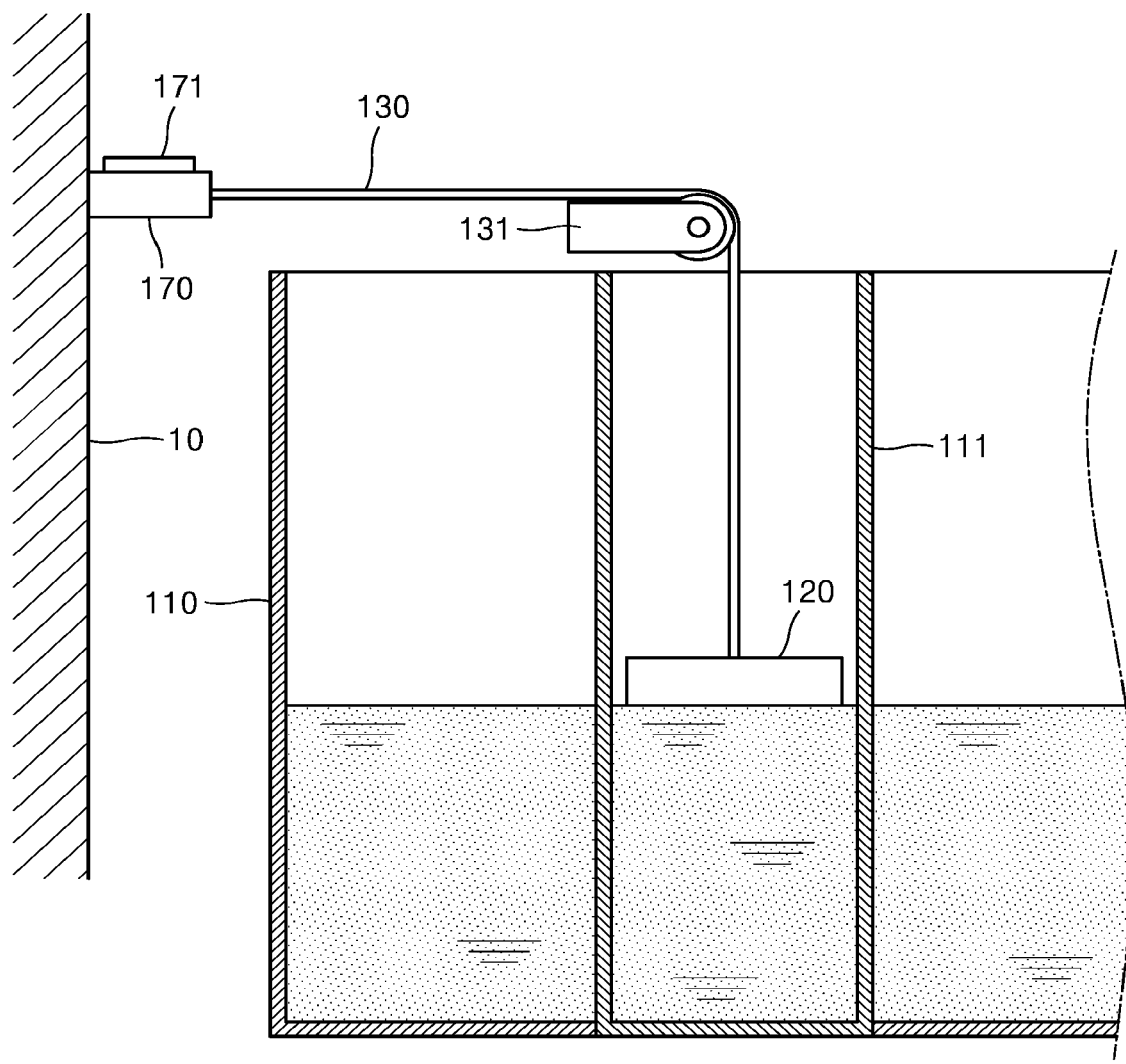
FIG. 1 is a view of a water-level measuring device using a gear ratio, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In this specification, principles of the disclosure are described and embodiments are disclosed, in order to clarify the scope of the claims of the disclosure and clearly convey the disclosure for one of ordinary skill in the art to implement the disclosure. Embodiments may be implemented in various forms.

The terms "comprises" or "comprising" used in various embodiments of the disclosure specify the presence of disclosed functions, operations, components, or the like, but do not preclude the addition of one or more functions, operations, components, or the like. It will be further understood that the terms "comprises" or "comprising" used herein specify the presence of stated features, integers, steps, operations, members, components, and/or groups thereof, but do not preclude the presence or addition of one or more other features, integers, steps, operations, members, components, and/or groups thereof.

When it is described that one or more components are "connected" or "coupled" to another component, it should be understood that the one or more components may be directly connected or coupled to the other component, but other intervening components may also be present between the one or more components and the other component. In contrast, when an element is referred to as being "directly on," "directly connected to" or "directly coupled to" another element or layer, there are no intervening elements or layers present.

Although the terms first, second, etc. used in this specification may be used herein to describe various elements, these terms do not limit the components. These terms are only used to distinguish one element from another.

One or more embodiments relate to a water-level measuring device using a gear ratio, and more particularly, to a water-level measuring device using a gear ratio, the water-level measuring device measuring a water level by using a weight balance between a float and a weight pendulum and measuring a water level of a water tank in a non-power mechanical fashion through a gear ratio between a first gear connected to the float and a cable and a second gear connected to the weight pendulum. Hereinafter, embodiments will be described in detail with reference to the accompanying drawings.

Referring to FIG. 1, a water-level measuring device using a gear ratio according to an embodiment may include a water tank 110, a float 120, a cable 130, a first gear 140, a second gear 150, and a weight pendulum 160.

The water tank 110 may be filed with a liquid including water. The water tank 110 may include various tanks and heaters used in industrial sites and may include various types of water tanks which may be filled with a liquid including water.

The float 120 may receive buoyancy from the water of the water tank 110, by floating over a water surface of the water filled in the water tank 110. The float 120 may include various materials which may receive buoyancy from the water of the water tank 110.

The cable 130 may be connected to the float 120 and may extend to the outside of the water tank 110. Referring to FIG. 1, the cable 130 may be supported by a supporter 131 and may extend to the outside of the water tank 110. The cable 130 may maintain tension while being connected to the float 120, and the float 120 may be vertically moved through the cable 130.

Figure 2:
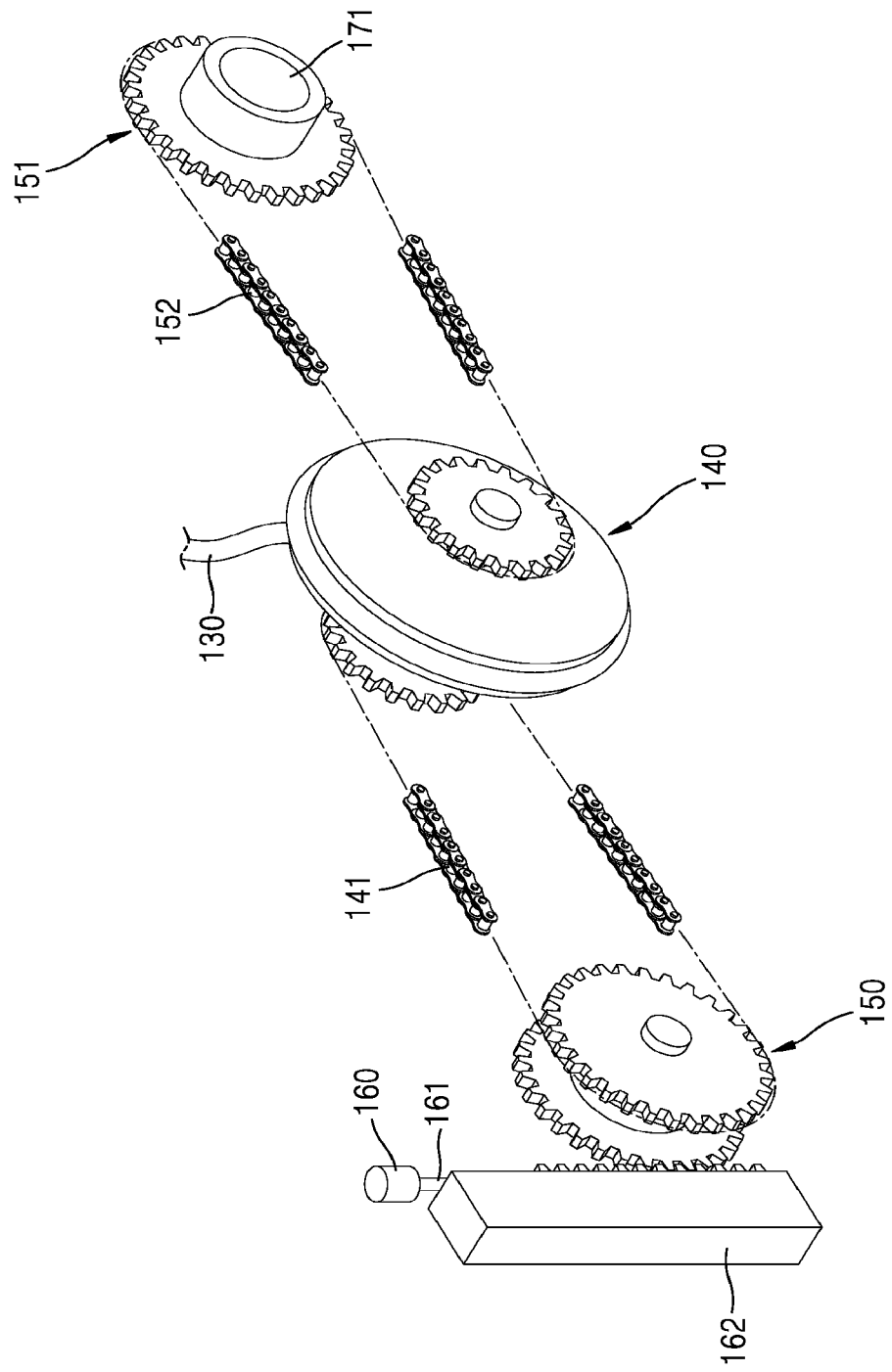
FIG. 2 is a view illustrating that a cable and a weight pendulum are connected to each other through a first gear and a second gear, and the cable and a water-level indicator are connected to each other through the first gear and a third gear.

Referring to FIG. 2, the first gear 140 may be connected to the cable 130. The first gear 140 may rotate via the movement of the cable 130 and may be connected with the second gear 150.

The second gear 150 may be connected with the first gear 140. The first gear 140 and the second gear 150 may be connected with each other through a first connection chain 141. The weight pendulum 160 may be connected with the second gear 150 and may move in up and down directions.

The second gear 150 may rotate via the movement of the weight pendulum 160, and via the rotation of the second gear 150, the first gear 140 may rotate. When the first gear 140 rotates, the cable 130 may move via the first gear 140. The weight pendulum 160 may be directly connected to the second gear 150. However, the weight pendulum 160 may be connected to the second gear 150 through other components, such as an auxiliary gear 153.

The water-level measuring device using the gear ratio according to an embodiment may measure a water level of the water tank 110 through the movements of the float 120, the cable 130, the first gear 140, the second gear 150, and the weight pendulum 160.

According to an embodiment, a weight of the float 120 may be greater than a weight of the weight pendulum 160, and the weight of the weight pendulum 160 may be greater than a weight of the cable 130. In addition, the weight of the float 120 may be greater than a sum of the weight of the weight pendulum 160 and the weight of the cable 130.

Hereinafter, an operating method of the water-level measuring device using the gear ratio is described in detail, according to an embodiment.

When a water-level of the water tank 110 stands still, the weight of the float 120, to which buoyancy is applied, and the weight of the weight pendulum 160 may form a balance. Here, when the water level of the water tank 110 falls, the buoyancy applied to the float 120 may be reduced.

As described above, the weight of the float 120 may be greater than the sum of the weight of the weight pendulum 160 and the weight of the cable 130, and thus, when the buoyancy applied to the float 120 is reduced, the float 120 may descend due to the weight of the float 120.

When the float 120 descends, the cable 130 connected with the float 120 may be pulled down, and thus, the first gear 140 may rotate, and via the rotation of the first gear 140, the second gear 150 may rotate.

The weight pendulum 160 may ascend via the rotation of the second gear 150. When the float 120 descends and reaches a descending water level of the water tank 110, the float 120 may receive again the buoyancy from the water of the water tank 110. When the float 120 receives the buoyancy again, the weight of the float 120 and the weight of the weight pendulum 160 may form a balance, so that the float 120 may stop descending.

When the water level of the water tank 110 rises, buoyancy may be additionally generated in the float 120, and thus, the tension of the cable 130 may be loosened. When the tension of the cable 130 is loosened, the weight of the weight pendulum 160 may become greater than the weight of the float 120 to which the buoyancy is applied.

When the weight of the weight pendulum 160 increase, the weight pendulum 160 may descend, and when the weight pendulum 160 descends, the second gear 150 connected with the weight pendulum 160 may rotate.

When the second gear 150 rotates, the first gear 140 may also rotate, and via the rotation of the first gear 140, the cable 130 may be wound. When the cable 130 is wound, the tension of the cable 130 may be maintained, and the float 120 may ascend. When the float 120 ascends and reaches an ascending level of the water tank 110, a portion of the buoyancy applied to the float 120 may be eliminated.

When the portion of the buoyancy applied to the float 120 is eliminated, the weight of the float 120 and the weight of the weight pendulum 160 may form a balance, and thus, the float 120 may stop ascending.

Based on this method, the locations of the float 120, the cable 130, and the weight pendulum 160 may be changed according to a level of the water surface of the water tank 110. The water-level measuring device using the gear ratio according to an embodiment may measure the water level and the water surface of the water tank 110 according to the locations of the cable 130 and the weight pendulum 160 that are changed according to the water surface of the water tank 110.

The cable 130 and the weight pendulum 160 may be connected with a measuring portion 170 configured to measure the water level and the water surface of the water tank 110, through a gear, etc., and the water level and the water surface of the water tank 110 may be indicated to the outside through the measuring portion 170.

Here, movement distances of the cable 130 and the weight pendulum 160 may be different from each other. The movement distance of the weight pendulum 160 may be less than the movement distance of the cable 130, and thus, by adjusting a gear ratio between the first gear 140 and the second gear 150, the relative movement distance between the cable 130 and the weight pendulum 160 may be adjusted.

The gear ratio between the first gear 140 and the second gear 150 may be changed according to a mounting environment (a weight of the weight pendulum, a length of the cable, etc.) of the float 120, the cable 130, and the weight pendulum 160. Also, types of the first gear 140 and the second gear 150 may be changed according to the mounting environment of the float 120, the cable 130, and the weight pendulum 160.

Also, a type of the first connection chain 141 configured to connect the first gear 140 with the second gear 160 may also be changed according to the mounting environment of the float 120, the cable 130, and the weight pendulum 160.

A previous water-surface and water-level measuring device may directly measure a water surface and a water level in a location near to a region to be measured, and thus, in an environmental condition hazardous due to radioactivity, acidity, corrosiveness, etc., it may be difficult for an operator to maintain and manage the measuring device.

Referring to FIG. 1, the cable 130 according to an embodiment may extend to the outside of the water tank 110. Because the cable 130 extends to the outside of the water tank 110, the water level of the water tank 110 may be measured from other locations than a region where environment conditions are hazardous due to, for example, radioactivity, acidity, corrosiveness, etc.

The water-level measuring device using the gear ratio according to an embodiment may further include a water-level indicator 171. The water-level indicator 171 may be connected with the first gear 140, and thus, may indicate the water level of the water tank 110 to the outside according to the rotation of the first gear 140.

Referring to FIG. 2, the water-level indicator 171 may be connected with a third gear 151, and the third gear 151 may be connected with the first gear 140. The third gear 151 may be connected with the first gear 140 through a second connection chain 152, and when the first gear 140 rotates, the third gear 151 may also rotate.

The water-level indicator 171 may be configured to indicate the water level of the water tank 110 to the outside, and the water level of the water tank 110 may be changed due to the rotation of the third gear 151.

The first gear 140 may rotate via the cable 130, and according to a location of the cable 130, a rotation location of the first gear 140 may also be changed. As described above, the location of the cable 130 may be changed according to the water level of the water tank 110, and thus, the rotation location of the first gear 140 may also be changed according to the water level of the water tank 110. The water-level indicator 171 may be configured to indicate the water level by using the rotation location of the first gear 140 that is changed according to the water level of the water tank 110.

Figure 3:
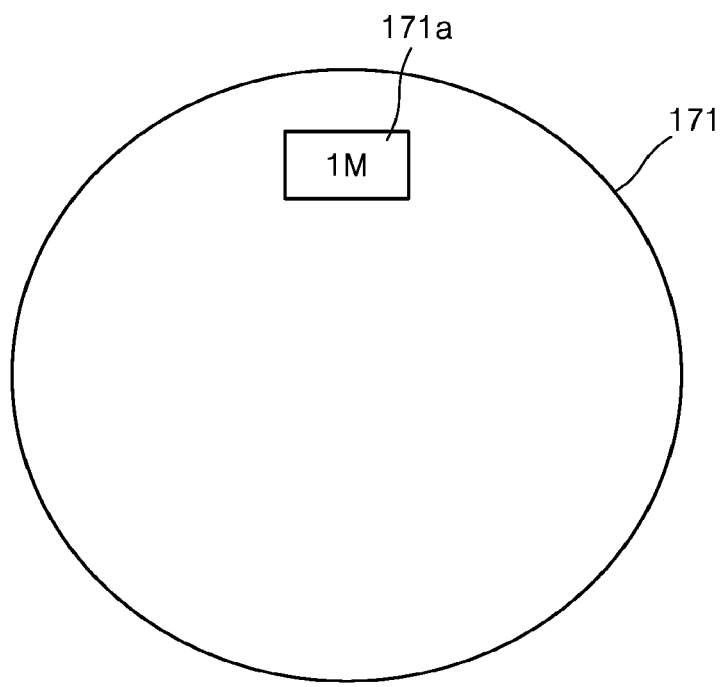
FIG. 3 is a view of a water-level indicator according to an embodiment.

Referring to FIG. 3, the water-level indicator 171 may include a water-level display 171a configured to display the water level of the water tank 110 to the outside, and the water-level display 171a may display the water level of the water tank 110 by using a number. However, the water-level display 171a is not limited thereto, and the water-level display 171a may display the water level of the water tank 110 by using various other available ways and structures which may enable recognition by the outside.

The water-level measuring device using the gear ratio according to an embodiment may further include a water-surface indicator 172. The water-surface indicator 172 may be connected to the weight pendulum 160 and may be arranged outside the water tank 110. The water-surface indicator 172 may indicate a level of the water surface.

Figure 4:
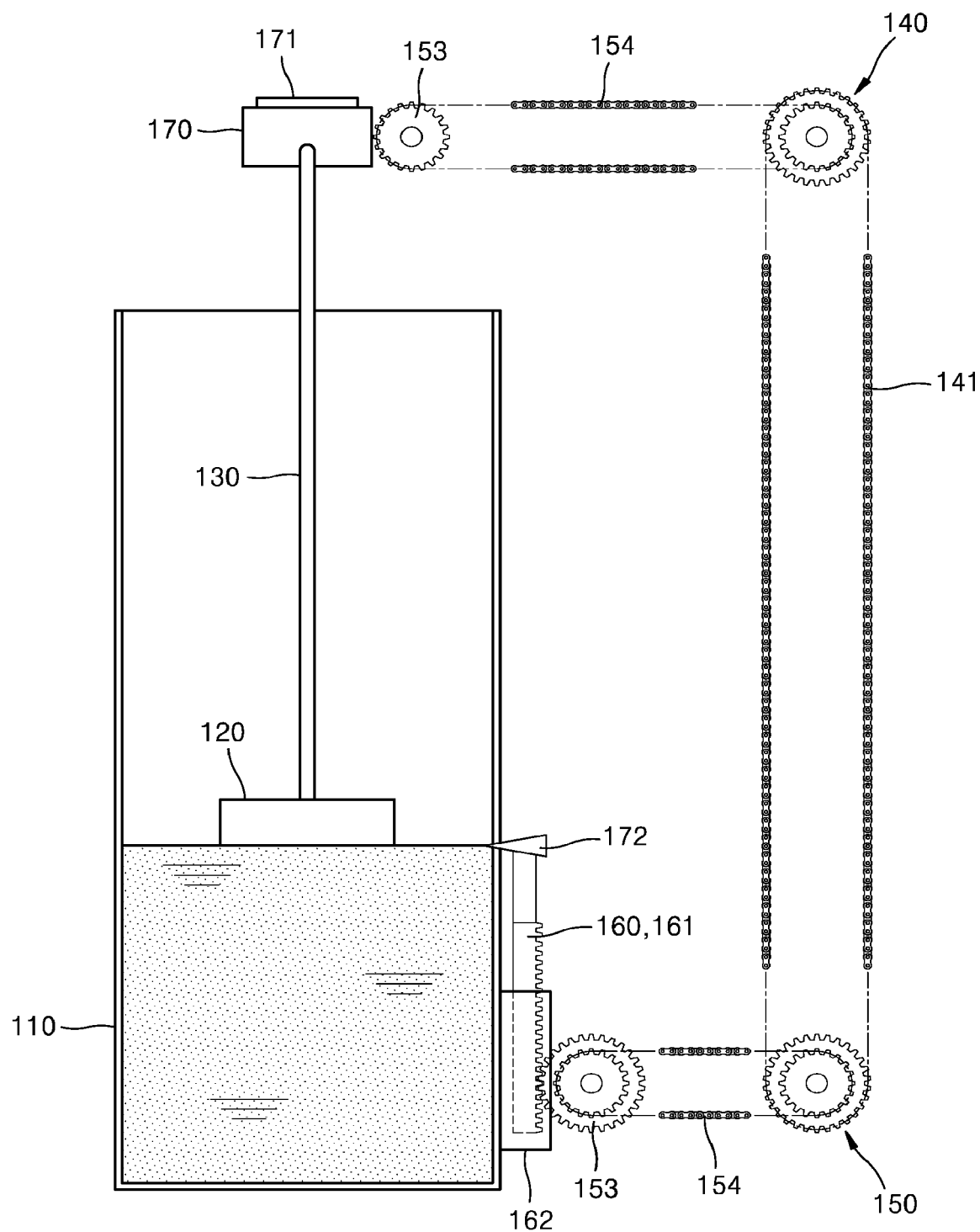
FIG. 4 is a view of a water-surface indicator connected to a weight pendulum according to an embodiment.

Referring to FIG. 4, the water-surface indicator 172 may be moved while being synchronized with the weight pendulum 160. As described above, the location of the weight pendulum 160 may be changed according to the water level of the water tank 110, and the water-surface indicator 172 may indicate the water surface of the water tank 110 to the outside based on the changed location of the weight pendulum 160.

According to an embodiment, the water-surface indicator 172 may be arranged on a line that extends in parallel with the water surface of the water tank 110, and the level of the water surface of the water tank 110 may be identified in the outside through the water-surface indicator 172.

The cable 130 according to an embodiment may extend to the outside of the water tank 110, and thus, the water level and the water surface of the water tank 110 may be measured in a location other than a location where environmental conditions are hazardous due to, for example, radioactivity, acidity, corrosiveness, etc.

The water-level indicator 171 may be mounted at a safe external wall 10, rather than a location of the hazardous environmental condition due to radioactivity, acidity, corrosiveness, etc., and the water-surface indicator 172 may also be mounted at a safe location to observe the water surface of the water tank 110.

According to an embodiment, a gear ratio of the first gear 140, the second gear 150, and the third gear 151 may be changed to indicate the water level of the water tank 110 by using the water-level indicator 171. Also, the gear ratio of the first gear 140, the second gear 150, and the third gear 151 may be changed to indicate the water surface of the water tank 110 by using the water-surface indicator 172.

That is, the water-level measuring device using the gear ratio according to an embodiment may adjust the gear ratio of the first gear 140, the second gear 150, and the third gear 151 to indicate the water level and the water surface of the water tank 110 to the outside through the relative locations of the float 120, the cable 130, and the weight pendulum 160.

However, the water-level measuring device using the gear ratio according to an embodiment is not limited to including the first gear 140, the second gear 150, and the third gear 151 and may further include other gears according to necessity.

According to an embodiment, the support wall 111 which vertically extends and into which the float 120 is inserted may be provided in the water tank 110. The float 120 may float over the water surface of the water tank 110 and may move along the water surface of the water tank 110.

When the float 120 moves along with the water surface of the water, the float 120 may sway in right and left directions due to waves or bubbles generated on the water surface. The support wall 111 may be configured to prevent the swaying of the float 120, and the support wall 111 may be provided to have a slightly greater width than the float 120.

The swaying of the float 120 in the right and left directions due to waves or bubbles of the water surface may be minimized by the support wall 111, and thus, the accuracy of the water-level measuring device using the gear ratio according to an embodiment may be improved.

The weight pendulum 160 may be connected to the second gear 150, and the weight pendulum 160 may be connected to the second gear 150 through a connector 161 and a bracket 162.

Referring to FIGS. 2 and 4, the connector 161 may be connected to the weight pendulum 160 and may slidingly move in up and down directions. The connector 161 may be configured to slidingly move in up and down directions according to the up and down movement of the weight pendulum 160, and the weight pendulum 160 and the second gear 150 may be connected with each other by the connector 161. The connector 161 may be directly connected with the second gear 150 or may be connected with the second gear 150 through the auxiliary gear 153.

The bracket 162 may vertically extend and the connector 161 may be inserted into the bracket 162. The weight pendulum 160 may move in up and down directions, and when the weight pendulum 160 moves in up and down directions, the weight pendulum 160 may sway in right and left directions.

The bracket 162 may be configured to prevent the swaying of the weight pendulum 160. The bracket 162 may vertically extend and restrict the right and left movement of the connector 161, so that the connector 161 may move only in up and down directions and may not sway in right and left directions.

The right and left movement of the connector 161 may be restricted by the bracket 162, and thus, the weight pendulum 160 connected with the connector 161 may be prevented from swaying in right and left directions.

The water-level measuring device using the gear ratio according to an embodiment may indicate the water level and the water surface of the water tank 110 through the water-level indicator 171 and the water-surface indicator 172. However, the water-level measuring device using the gear ratio is not limited to using the water-level indicator 171 and the water-surface indicator 172. The water-level measuring device using the gear ratio according to an embodiment may include various measuring devices.

Figure 5:
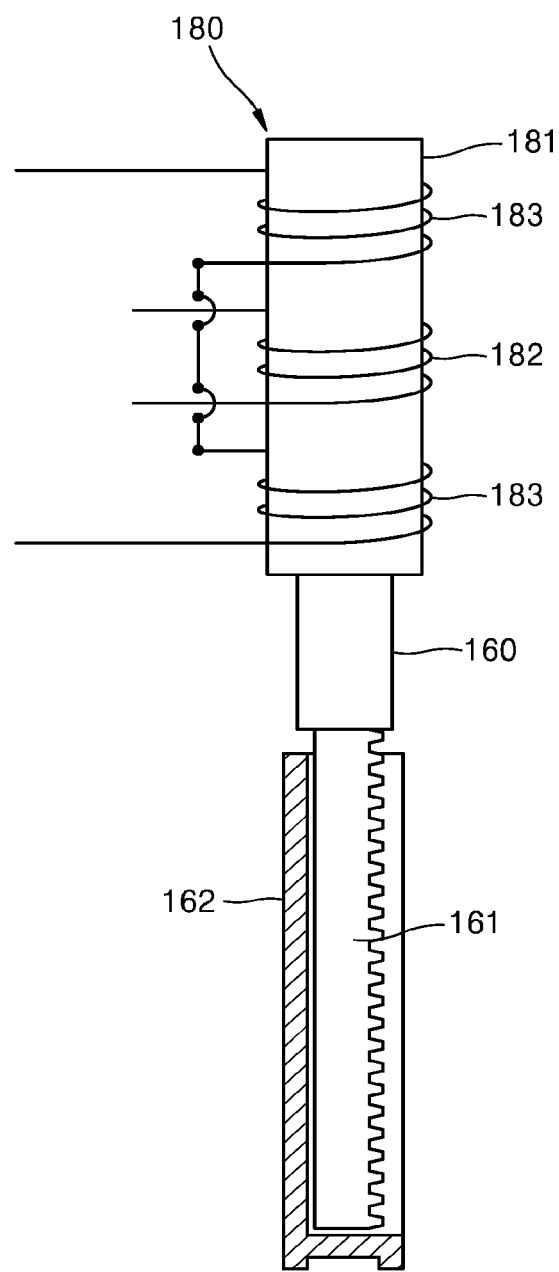
FIG. 5 is a view illustrating a water-level transmitter configured to generate a signal to the outside according to a motion of a weight pendulum, according to an embodiment.
Figure 6:
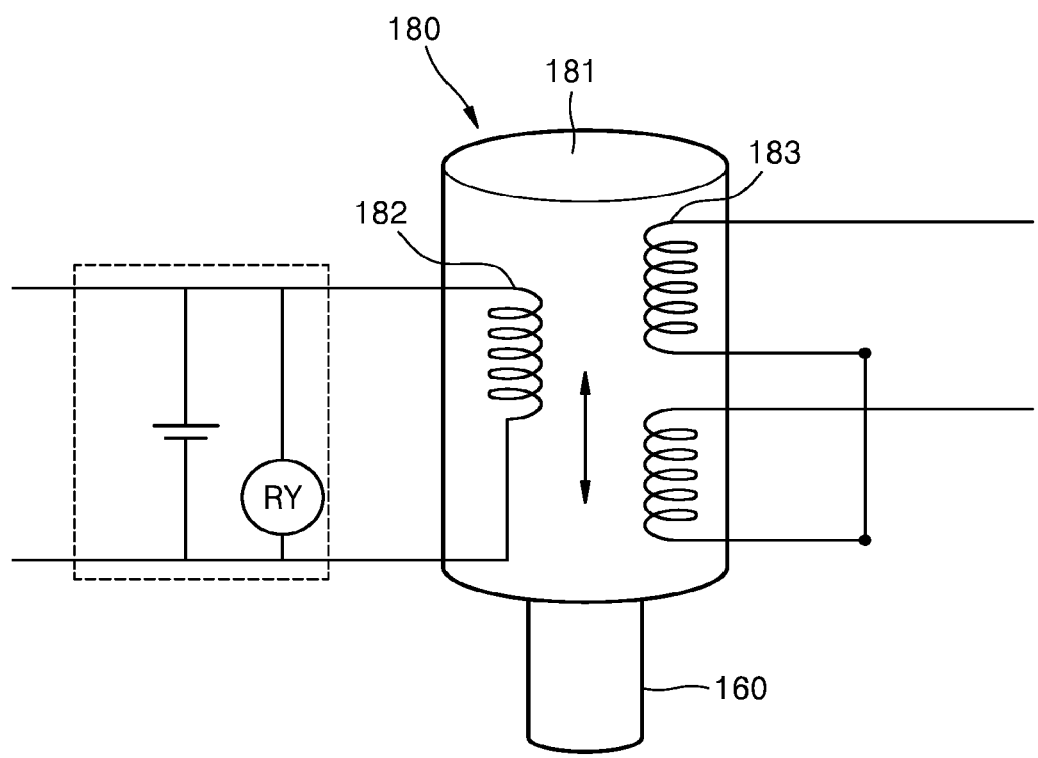
FIG. 6 is a view illustrating an input terminal and an output terminal provided in a water-level transmitter, according to an embodiment.

Referring to FIGS. 5 and 6, the water-level measuring device using the gear ratio according to an embodiment may further include a water-level transmitter 180 configured to transmit a signal for measuring a water level of the water tank 110 to the outside.

The water-level transmitter 180 may be configured to transmit the signal corresponding to the water level of the water tank 110 to the outside. The water-level transmitter 180 may transmit the signal to the outside according to a movement of the weight pendulum 160. The water-level transmitter 180 may include a space into which the weight pendulum 160 may be inserted and in which the weight pendulum 160 may move.

Referring to FIGS. 5 and 6, the water-level transmitter 180 may include a housing 181, an input terminal 182, and an output terminal 183.

The housing 181 may include a space into which the weight pendulum 160 may be inserted and in which the weight pendulum 160 may move. The input terminal 182 and the output terminal 183 may be connected to the housing 181 and may include an electric wire coil.

The input terminal 182 may be connected to the housing 181 and may be configured to supply a voltage. The output terminal 183 may be connected to the housing 181 and may be configured to generate a voltage according to a movement of the weight pendulum 160, wherein the voltage generated by the output terminal 183 may be the signal transmitted to the outside.

As described above, the weight pendulum 160 may move according to a water level of the water tank 110. When the weight pendulum 160 moves according to a change in the water level of the water tank 110, the weight pendulum 160 may move while being inserted into the housing 181. Here, the weight pendulum 160 may include a material for generating the voltage in the output terminal 183 according to the movement of the weight pendulum 160.

When the input terminal 182 included in the housing 181 supplies a voltage, and the weight pendulum 160 is inserted into the housing 181 and moves, the output terminal 183 may generate a voltage.

The voltage generated by the output terminal 183 may be changed according to up and down movement of the weight pendulum 160. The voltage changed according to the up and down movement of the weight pendulum 160 may be transmitted to the outside, and the water level of the water tank 110 may be identified by detecting the voltage.

The water-level transmitter 180 may be configured to transmit water level information to the outside of the water tank 110. The water level information of the water tank 110 may be identified outside the water tank 110 through the water-level transmitter 180.

Referring to FIG. 6, the input terminal 182 may include a battery. The input terminal 182 may receive power from the outside and there may be a risk of blockage of the power supply according to an external environment.

However, when the battery is included in the input terminal 182, even when power is lost according to a change in the external environment, the voltage may be supplied through the input terminal 182. In detail, when the power is lost according to a change in the external environment, a relay voltage may be lost, and thus, a switch is changed from an off-state to an on-state, so that power may be applied from the battery for a predetermined period of time. Based on this operation, the reliability of the water-level measuring device using the gear ratio according to an embodiment may be improved.

The water-level measuring device using the gear ratio according to an embodiment may have the following effects.

The water-level measuring device using the gear ratio according to an embodiment may measure a water level by using a weight balance of the float and the weight pendulum and may measure a water level of the water tank in a non-power mechanical fashion by using the gear ratio between the first gear connected with the float and the cable and the second gear connected with the weight pendulum. Thus, the water-level measuring device using the gear ratio may measure the water level without being affected by an external environment.

Also, the water-level measuring device using the gear ratio according to an embodiment may measure a water surface by making the cable connected with the float extend to the outside of the water tank to be connected with the weight pendulum, and then, measuring the water surface through the weight pendulum. Thus, the water surface of the water tank which is not available for measurement due to an external environment may be measured without deteriorating the readability of the water gauge.

In particular, the water-level measuring device using the gear ratio according to an embodiment may not physically read a level of the water surface in the water tank. Rather, the water-level measuring device may recognize the level of the water surface through the float, the cable, and the weight pendulum, and thus, the readability and the accuracy may be improved, compared with a previous water gauge.

Also, the water-level measuring device using the gear ratio according to an embodiment may simultaneously measure the water surface and the water level by making the cable connected with the float extend to the outside of the water tank and connecting the cable with the weight pendulum.

Also, the water-level measuring device using the gear ratio according to an embodiment may make the cable connected with the float extend to the outside of the water tank and may mount the measuring portion outside the water tank, and thus, an exposure of an operator to an external environment during a maintenance operation of the measuring portion may be minimized.

The previous water-surface and water-level measuring device may directly measure a water surface and a water level in a location adjacent to a region to be measured, and thus, where environmental conditions are harmful due to, for example, radioactivity, acidity, corrosiveness, etc., it may be difficult for an operator to maintain and manage the measuring portion.

However, the water-level measuring device using the gear ratio according to an embodiment may mechanically measure the water surface and the water level by using the float, the cable, and the weight pendulum, and thus, may semi-permanently measure the water surface and the water level.

Also, the water-level measuring device using the gear ratio according to an embodiment may make the cable connected to the float extend to the outside of the water tank and connect the cable with the weight pendulum, and thus, the measuring portion may be mounted to be apart from the region to be measured. Thus, it may be possible to mount the measuring portion in a region having an environmental condition (with respect to radioactivity, acidity, corrosiveness, etc.) having a good accessibility for an operator.

In addition, in the case of a previous measuring device using an indirect measuring method, such as a measuring device using ultrasonic waves, laser beams, etc., it may be highly probable that an error may occur according to a mounting environment, etc. However, the water-level measuring device using the gear ratio according to an embodiment may not use electrical and electronic equipment and may use non-power mechanical equipment. Thus, a probability of error occurrence may be reduced, and the reliability of the operation of the measuring device may be improved.

According to an embodiment, a water level may be measured by using a weight balance of the float and the weight pendulum, and a water level of the water tank may be measured in a non-power mechanical fashion by using the gear ratio between the first gear connected with the float and the cable and the second gear connected with the weight pendulum. Thus, the water level may be measured without being affected by an external environment.

Also, according to an embodiment, a water surface may be measured by making the cable connected with the float extend to the outside of the water tank to be connected with the weight pendulum, and then, measuring the water surface through the weight pendulum. Thus, the water surface of the water tank which is not available for measurement due to an external environment may be measured without deteriorating the readability of the water gauge.

Also, according to an embodiment, a water surface and a water level may be simultaneously measured by making the cable connected with the float extend to the outside of the water tank and connecting the cable with the weight pendulum. Also, the cable connected with the float may extend to the outside of the water tank, and the measuring portion may be mounted outside the water tank, and thus, an exposure of an operator to an external environment during a maintenance operation of the measuring portion may be minimized.

Furthermore, according to an embodiment, electrical and electronic equipment may not be used, and non-power mechanical equipment may be used. Thus, a probability of the error occurrence may be reduced, and the reliability of the operation of the measuring device may be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A water-level measuring device measuring a water level by using a gear ratio, the water-level measuring device comprising:
    a water tank filled with a water;
    a float receiving buoyancy by being floated over a water surface of the water filled in the water tank;
    a cable connected to the float and extending to the outside of the water tank;
    a first gear connected with the cable;
    a second gear connected with the first gear;
    a weight pendulum connected with the second gear and moving in up and down directions; and
    a water-level transmitter configured to transmit a signal according to a movement of the weight pendulum,
    wherein when the water level of the water tank descends, the weight pendulum ascends due to a weight of the float, and when the water level of the water tank ascends, the weight pendulum descends due to the buoyancy of the float,
    wherein the water-level transmitter includes:
    a housing including a space into which the weight pendulum is inserted and in which the weight pendulum is configured to move;
    an input terminal connected with the housing and configured to supply a voltage; and
    an output terminal connected with the housing and configured to generate a voltage according to the movement of the weight pendulum.

2. The water-level measuring device of claim 1, wherein the input terminal includes a battery.

* * * * *